US012789470B2

(12) United States Patent
Teramoto

(10) Patent No.: US 12,789,470 B2
(45) Date of Patent: Nov. 10, 2026

(54) THREE-DIMENSIONAL SHAPING APPARATUS

(71) Applicant: SEIKO EPSON CORPORATION, Tokyo (JP)

(72) Inventor: Tatsuya Teramoto, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 73 days.

(21) Appl. No.: 18/670,325

(22) Filed: May 21, 2024

(65) Prior Publication Data

US 2024/0391177 A1 Nov. 28, 2024

(30) Foreign Application Priority Data

May 24, 2023 (JP) ................................ 2023-085217

(51) Int. Cl.

*B29C 64/393* (2017.01)
*B29C 64/209* (2017.01)
*B29C 64/295* (2017.01)
*B33Y 30/00* (2015.01)
*B33Y 50/02* (2015.01)

(52) U.S. Cl.

CPC .......... *B29C 64/393* (2017.08); *B29C 64/209* (2017.08); *B29C 64/295* (2017.08); *B33Y 30/00* (2014.12); *B33Y 50/02* (2014.12)

(58) Field of Classification Search

None

See application file for complete search history.

(56) References Cited

U.S. PATENT DOCUMENTS

| | | | | |
|---|---|---|---|---|
| 2020/0298478 | A1* | 9/2020 | MacNeish, III ....... | B33Y 30/00 |
| 2020/0406548 | A1* | 12/2020 | Yuwaki ................. | B29C 64/106 |
| 2022/0314545 | A1* | 10/2022 | Bromberg ............ | B29C 64/165 |
| 2022/0324170 | A1* | 10/2022 | Reith .................. | A61F 2/30734 |

FOREIGN PATENT DOCUMENTS

| | | | | | |
|---|---|---|---|---|---|
| CN | 106392076 | A * | 2/2017 | ............ | B33Y 30/00 |
| JP | 2017-523063 | A | 8/2017 | | |
| WO | WO2015/193819 | A | 12/2015 | | |

* cited by examiner

*Primary Examiner* — Farah Taufiq
*Assistant Examiner* — Xinwen Ye
(74) *Attorney, Agent, or Firm* — WORKMAN NYDEGGER

(57) ABSTRACT

A three-dimensional shaping apparatus includes a discharge unit including a plasticizing unit including a first heater and configured to plasticize a material to generate a plasticized material and a nozzle configured to discharge the plasticized material, a stage on which the plasticized material is stacked, a heating unit including a second heater configured to heat the plasticized material stacked on the stage, the heating unit being located above a tip of the nozzle at least when a three-dimensional shaped object is shaped, and a sensor configured to detect positional deviation of the heating unit.

7 Claims, 10 Drawing Sheets

THREE-DIMENSIONAL SHAPING APPARATUS

The present application is based on, and claims priority from JP Application Serial Number 2023-085217, filed May 24, 2023, the disclosure of which is hereby incorporated by reference herein in its entirety.

BACKGROUND

1. Technical Field

The present disclosure relates to a three-dimensional shaping apparatus.

2. Related Art

JP-T-2017-523063 discloses a technique of, in a three-dimensional shaping technique, heating a preceding layer with an energy source coupled to a head via a support arm and stacking a following layer on the heated front layer in order to improve interlayer adhesion.

JP-T-2017-523063 is an example of the related art.

In the techniques described in JP-T-2017-523063, for example, when a molding defect such as warpage occurs in a shaped object, an energy source is likely to come into contact with the shaped object.

SUMMARY

According to a first aspect of the present disclosure, a three-dimensional shaping apparatus is provided. The three-dimensional shaping apparatus includes: a discharge unit including a plasticizing unit including a first heater and configured to plasticize a material to generate a plasticized material and a nozzle configured to discharge the plasticized material; a stage on which the plasticized material is stacked; a heating unit including a second heater configured to heat the plasticized material stacked on the stage, the heating unit being located above a tip of the nozzle at least when a three-dimensional shaped object is shaped; and a sensor configured to detect positional deviation of the heating unit.

DESCRIPTION OF EMBODIMENTS

A. First Embodiment

Figure 1:
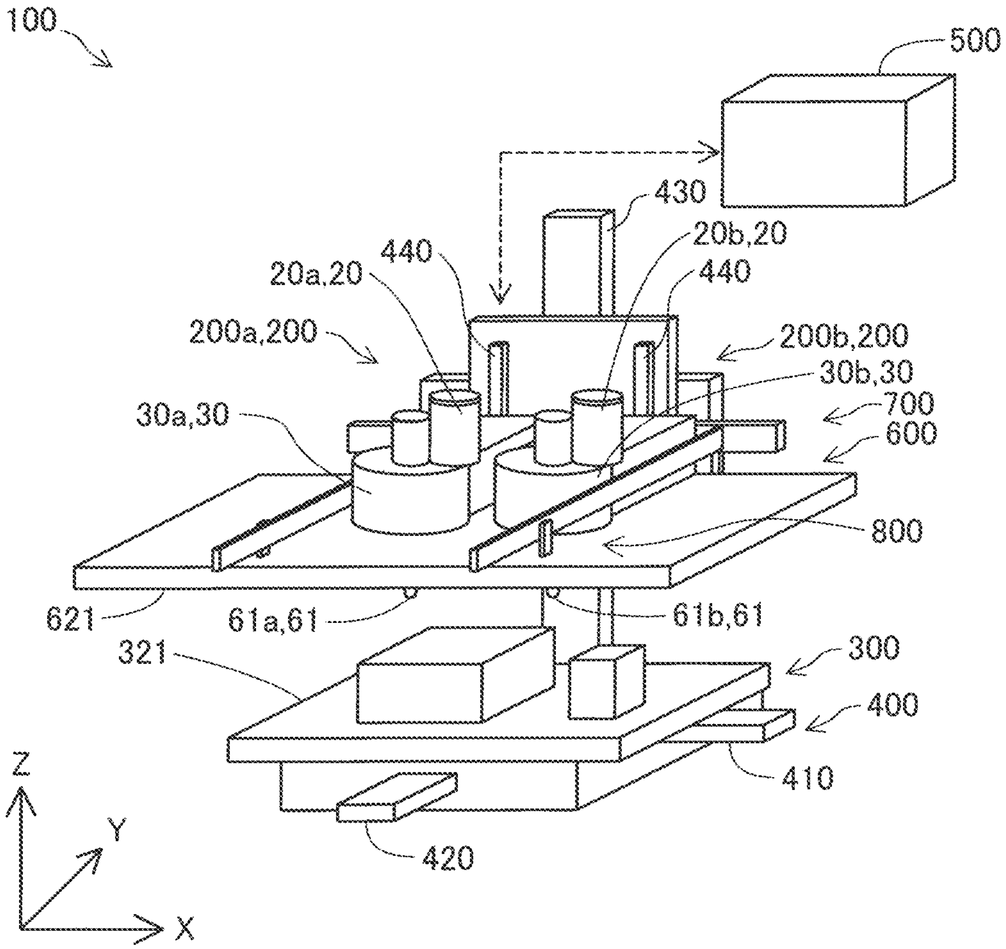
FIG. 1 is a first diagram illustrating a schematic configuration of a three-dimensional shaping apparatus in a first embodiment.
Figure 2:
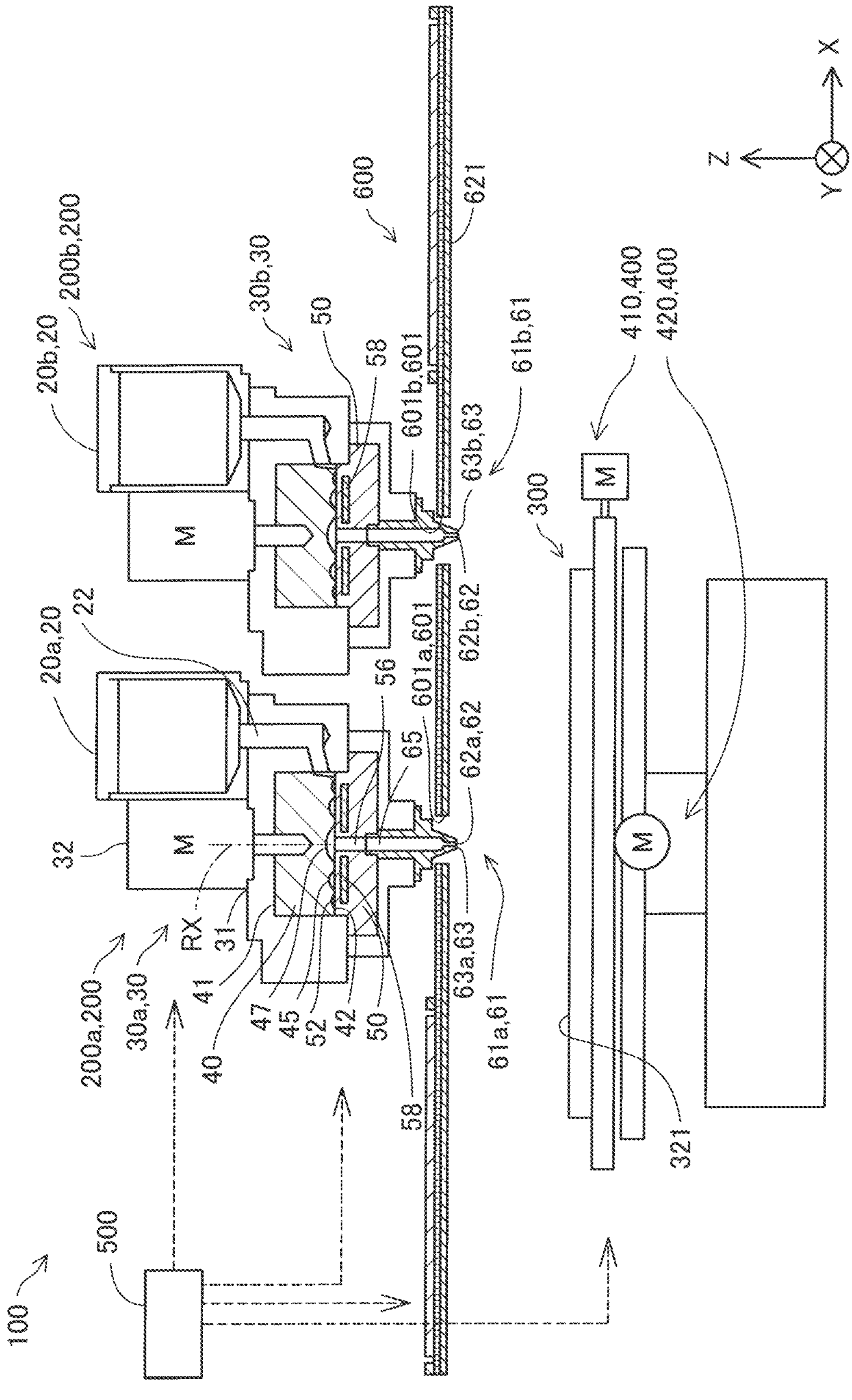
FIG. 2 is a second diagram illustrating the schematic configuration of the three-dimensional shaping apparatus in the first embodiment.

FIG. 1 is a first diagram illustrating a schematic configuration of a three-dimensional shaping apparatus 100 in a first embodiment. FIG. 2 is a second diagram illustrating the schematic configuration of the three-dimensional shaping apparatus 100 in the first embodiment. In FIGS. 1 and 2, arrows extending in X, Y, and Z directions orthogonal to one another are illustrated. The X, Y, and Z directions are directions extending along an X axis, a Y axis, and a Z axis, which are three spatial axes orthogonal to one another, and include both of a direction on one side and the opposite direction thereto respectively extending along the X axis, the Y axis, and the Z axis. The X axis and the Y axis are axes extending along the horizontal plane and the Z axis is an axis extending along the vertical line. A −Z direction is the vertical direction and a +Z direction is a direction opposite to the vertical direction. The −Z direction is referred to as "lower" as well and the +Z direction is referred to as "upper" as well. In the other figures, the arrows extending in the X, Y, and Z directions are illustrated as appropriate. The X, Y, and Z directions in FIGS. 1 and 2 and the X, Y, and Z directions in the other figures represent the same directions.

The three-dimensional shaping apparatus 100 includes a discharge unit 200, a stage 300, a moving unit 400, a control unit 500, and a movable unit 700.

The control unit 500 is a control device controlling an operation of the entire three-dimensional shaping apparatus 100. The control unit 500 is configured by a computer including one or a plurality of processors, a memory, and an input and output interface that inputs a signal from and outputs a signal to the outside. The processor executes a program or an instruction read onto a main storage device, whereby the control unit 500 exerts various functions such as a function of executing shaping processing for shaping a three-dimensional shaped object and a function of executing calibration processing explained below. Instead of being configured with the computer, the control unit 500 may be implemented by a configuration in which a plurality of circuits for implementing at least a part of the functions are combined.

Under the control of the control unit 500, the discharge unit 200 discharges a plasticized material, obtained by melting a solid-state material to be paste-like, onto the stage 300 for shaping, which serves as a base of a three-dimensional shaped object. The discharge unit 200 includes a material supply unit 20, which is a supply source of the material before being converted into the plasticized material, a plasticizing unit 30 that plasticizes the material to generate the plasticized material, and a nozzle 61 that discharges the generated plasticized material. The discharge unit 200 is referred to as head as well.

The three-dimensional shaping apparatus 100 in the present embodiment includes a first discharge unit **200*a* and a second discharge unit 200*b* as the discharge unit 200. The first discharge unit 200*a* includes a first material supply unit 20*a* as the material supply unit 20, includes a first plasticizing unit 30*a* as the plasticizing unit 30, and includes a first nozzle 61*a* as the nozzle 61. The second discharge unit 200*b* includes a second material supply unit 20*b* as the material supply unit 20, includes a second plasticizing unit 30*b* as the plasticizing unit 30, and includes a second nozzle 61*b* as the nozzle 61. The first discharge unit 200***a* and the second discharge unit 200*b* are disposed side by side in the X direction such that the position of the first nozzle 61*a* in the Y direction and the position of the second nozzle 61*b* in the Y direction coincide with each other. In the present embodiment, the second discharge unit 200*b* is disposed at a position in the +X direction of the first discharge unit 200*a*. Since the configuration of the first discharge unit 200*a* and the configuration of the second discharge unit 200*b* are the same, in the following explanation, the first discharge unit 200*a* and the second discharge unit 200*b* are sometimes simply referred to as a discharge unit 200 when being not particularly distinguished. In order to distinguish constituent members of the first discharge unit 200*a* and the second discharge unit 200*b*, a reference sign "a" is added to the constituent members of the first discharge unit 200*a* and a reference sign "b" is added to the constituent members of the second discharge unit 200*b*.

A material in a state of pellet, powder, or the like is stored in the material supply unit 20. As the material, a resin material such as acrylonitrile butadiene styrene (ABS), polyetheretherketone (PEEK), or polypropylene (PP) is used. The material supply unit 20 in the present embodiment is configured by a hopper. As illustrated in FIG. 2, a supply path 22 that connects the material supply unit 20 and the plasticizing unit 30 is provided below the material supply unit 20. The material supply unit 20 supplies the material to the plasticizing unit 30 via the supply path 22.

As illustrated in FIG. 2, the plasticizing unit 30 includes a screw case 31, a drive motor 32, a screw 40, and a barrel 50. The plasticizing unit 30 plasticizes at least a part of the material supplied from the material supply unit 20 to generate a paste-like plasticized material having flowability and supplies the plasticized material to the nozzle 61. "Plasticize" is a concept including melting and means changing a solid to a state having flowability. Specifically, in the case of a material in which glass transition occurs, plasticization means raising the temperature of the material to be equal to or higher than the glass transition point. In the case of a material in which glass transition does not occur, "plasticize" means raising the temperature of the material to be equal to or higher than the melting point.

Figure 3:
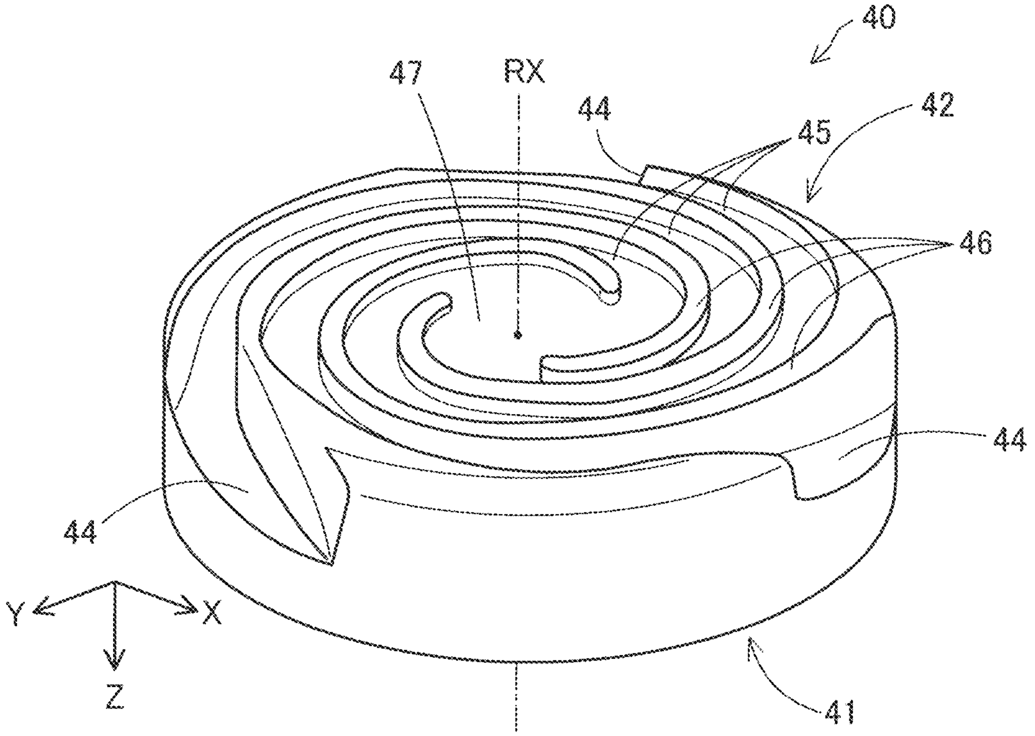
FIG. 3 is a perspective view illustrating a schematic configuration of a screw.
Figure 4:
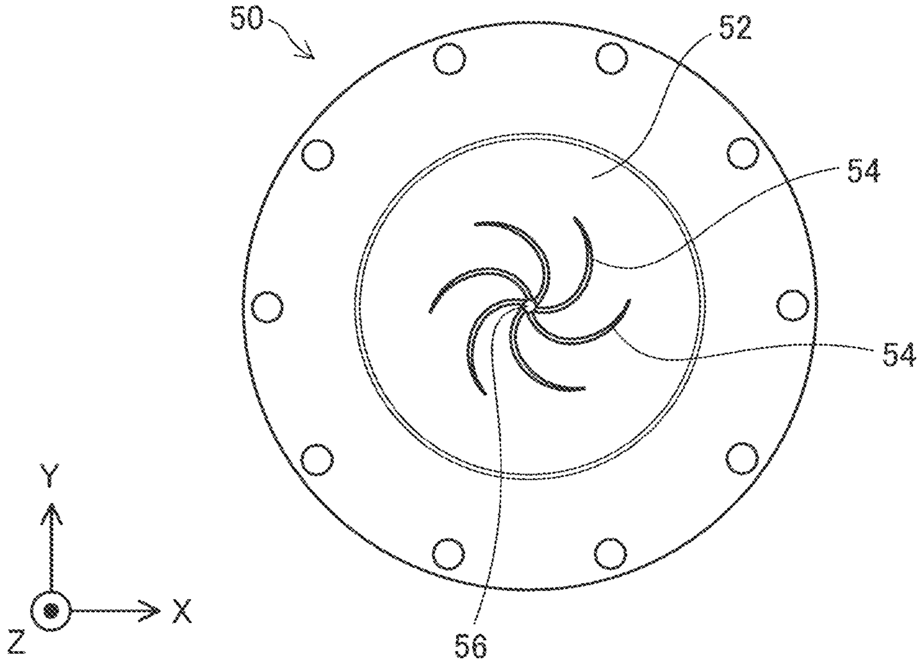
FIG. 4 is a schematic plan view of a barrel.

FIG. 3 is a perspective view illustrating a schematic configuration of a screw lower surface 42 side of the screw 40. FIG. 4 is a schematic plan view illustrating a barrel upper surface 52 side of the barrel 50. The screw 40 has a substantially cylindrical shape, the length in an axial direction, which is a direction extending along a center axis RX of the screw 40, of which is smaller than the length in a direction orthogonal to the axial direction thereof. The screw 40 is disposed such that the center axis RX serving as a rotation center of the screw 40 is parallel to the Z direction. The screw 40 is referred to as flat screw, rotor, or scroll as well.

As illustrated in FIG. 2, the screw 40 is accommodated in the screw case 31. A screw upper surface 41 side of the flat screw 40 is coupled to the drive motor 32. The screw 40 is rotated in the screw case 31 by a rotation driving force generated by the drive motor 32. The drive motor 32 is driven under the control of the control unit 500. Note that the screw 40 may be driven by the drive motor 32 via a decelerator.

As illustrated in FIG. 3, a spiral groove 45 is formed in the screw lower surface 42. The supply path 22 of the material supply unit 20 explained above communicates with the groove 45 from a side surface of the screw 40. The groove 45 is continuous to a material introduction port 44 formed in the side surface of the screw 40. The material introduction port 44 is a portion that receives the material supplied via the supply path 22 of the material supply unit 20. As illustrated in FIG. 3, in the present embodiment, three grooves 45 are formed by being separated by ridge portions 46. Note that the number of the grooves 45 is not limited to three and may be one or may be two or more. A shape of the grooves 45 is not limited to the spiral shape and may be a helical shape or an involute curve shape or may be a shape extending to draw an arc from a center 47 toward the outer circumference.

As illustrated in FIG. 2, the barrel 50 is disposed below the screw 40. The barrel upper surface 52 faces the screw lower surface 42. A space is formed between the grooves 45 of the screw lower surface 42 and the barrel upper surface 52. In the barrel 50, a communication hole 56 communicating with a nozzle flow path 65 of the nozzle 61 explained below is provided on the center axis RX of the screw 40. A first heater 58 is built in the barrel 50 at a position facing the grooves 45 of the screw 40. The temperature of the first heater 58 is controlled by the control unit 500.

As illustrated in FIG. 4, a plurality of guide grooves 54 are formed around the communication hole 56 in the barrel upper surface 52. One end of each the guide grooves 54 is coupled to the communication hole 56 and extends in a spiral shape from the communication hole 56 toward the outer circumference of the barrel upper surface 52. Each of the guide grooves 54 has a function of guiding the plasticized material to the communication hole 56. Note that one end of the guide groove 54 may not be coupled to the communication hole 56. The guide grooves 54 may not be formed in the barrel 50.

A material supplied into the grooves 45 of the screw 40 flows along the grooves 45 according to the rotation of the screw 40 while being plasticized in the grooves 45 and is guided to the center 47 of the screw 40 as a plasticized material. The paste-like plasticized material exhibiting flowability, which has flowed into the center 47, is supplied to the nozzle 61 via the communication hole 56. Note that not all of substances forming the plasticized material have to be plasticized. The plasticized material only has to be converted into a state having flowability as a whole by plasticizing at least a part of the substances forming the plasticized material.

As illustrated in FIG. 2, the nozzle 61 includes the nozzle flow path 65 and a nozzle opening 62 provided at a tip 63 of the nozzle 61. The nozzle flow path 65 is a flow path for the plasticized material formed in the nozzle 61 and is coupled to the communication hole 56 of the barrel 50 explained above. The nozzle opening 62 is a portion that is provided at an end portion of the nozzle flow path 65 on a side communicating with the atmosphere and that has a reduced flow path cross section of the nozzle flow path 65. A first nozzle opening 62*a* is formed at a first tip 63*a* of the first nozzle 61*a* and a second nozzle opening 62*b* is formed at a second tip 63*b* of the second nozzle 61*b*. The plasticized material generated by the plasticizing unit 30 is supplied to the nozzle 61 via the communication hole 56 and is discharged from the nozzle opening 62 via the nozzle flow path 65.

The stage 300 is disposed at a position facing the nozzle opening 62. The three-dimensional shaping apparatus 100 shapes a three-dimensional shaped object by discharging the plasticized material from the nozzle opening 62 toward a shaping surface 321 of the stage 300 and stacking a layer of the plasticized material on the shaping surface 321. The plasticized material layer stacked on the shaping surface 321 is referred to as shaping layer as well. A detailed configuration of the stage 300 is explained below.

The moving unit 400 changes relative positions of the nozzle 61 and the stage 300. In the embodiment, the moving unit 400 changes the relative positions of the nozzle 61 and the stage 300 by moving the discharge unit 200 in the Z direction, which is a stacking direction, and moving the stage 300 in a direction intersecting the stacking direction. More specifically, the moving unit 400 in the embodiment changes the relative positions of the nozzle 61 and the stage 300 in the Z direction by moving the discharge unit 200 in the Z direction and changes the relative positions of the nozzle 61 and the stage 300 in the X direction and the Y direction by moving the stage 300 in the X direction and the Y direction orthogonal to the Z direction.

As illustrated in FIG. 1, the moving unit 400 includes a first electric actuator 410 that moves the stage 300 in the X direction, a second electric actuator 420 that moves the stage 300 and the first electric actuator 410 in the Y direction, and a third electric actuator 430 that moves the discharge unit 200 in the Z direction. The first electric actuator 410, the second electric actuator 420, and the third electric actuator 430 are driven under the control of the control unit 500. The third electric actuator 430 moves the first discharge unit 200*a* and the second discharge unit 200*b* in the Z direction by moving the movable unit 700, in which the first discharge unit 200*a* and the second discharge unit 200*b* are disposed, in the Z direction. The third electric actuator 430 and the movable unit 700 are omitted in FIG. 2. Note that the moving unit 400 may be configured by another actuator such as an air cylinder.

As illustrated in FIG. 1, the movable unit 700 supports a heating unit 600 to thereby dispose the heating unit 600 at a position facing the stage 300. Therefore, the third electric actuator 430 in the present embodiment moves the movable unit 700 in the Z direction together with the discharge unit 200 in a state where a positional relationship between the discharge unit 200 and the movable unit 700 is maintained. That is, the movable unit 700 is configured such that the relative positions of the nozzle 61 and the stage 300 change. The heating unit 600 supported by the movable unit 700 is configured such that the relative positions of the nozzle 61 and the stage 300 change. With such a configuration, the movable unit 700 changes the relative positions of the discharge unit 200 and the heating unit 600 with respect to the stage 300 by interlocking the discharge unit 200 and the heating unit 600.

As explained above, in the present embodiment, the moving unit 400 moves the stage 300 in the X direction and the Y direction and moves the discharge unit 200 in the Z direction. In contrast, for example, the moving unit 400 may move the stage 300 in the Z direction and move the discharge unit 200 in the X direction and the Y direction. The moving unit 400 may move the stage 300 in the X direction, the Y direction, and the Z direction without moving the discharge unit 200. Besides, the moving unit 400 may move the discharge unit 200 in the X direction, the Y direction, and the Z direction without moving the stage 300.

In the following explanation, a change in the relative position of the nozzle 61 with respect to the stage 300 is sometimes simply referred to as movement of the nozzle 61. In the present embodiment, for example, having moved the stage 300 in the +X direction with respect to the nozzle 61 can be replaced with having moved the nozzle 61 in the −X direction. Similarly, a change in the relative positions of the discharge unit 200, the heating unit 600, and the movable unit 700 with respect to the stage 300 is sometimes simply referred to as movement of the discharge unit 200, the heating unit 600, and the movable unit 700.

Figure 5:
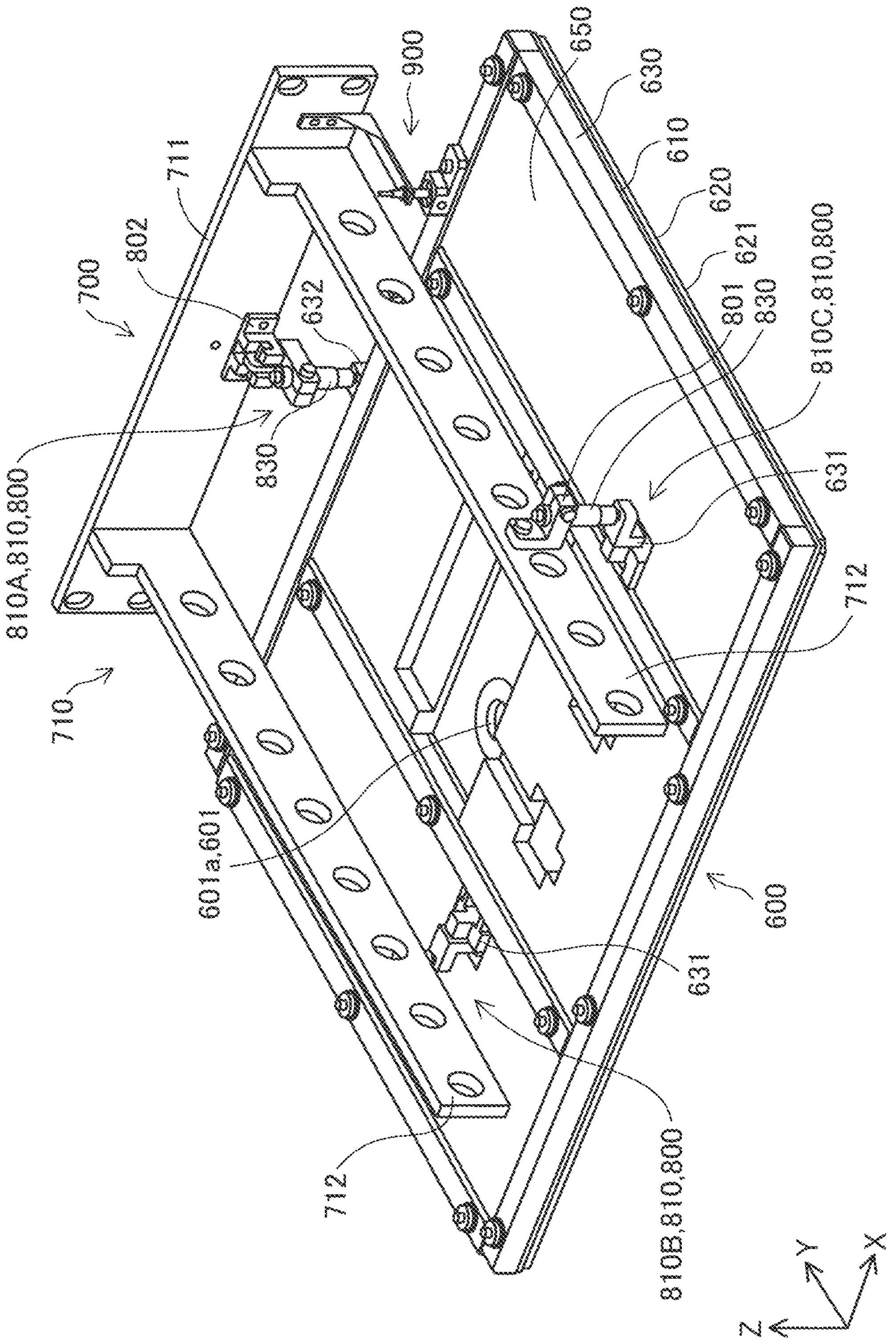
FIG. 5 is a perspective view illustrating a schematic configuration of a heating unit and a movable unit.
Figure 6:
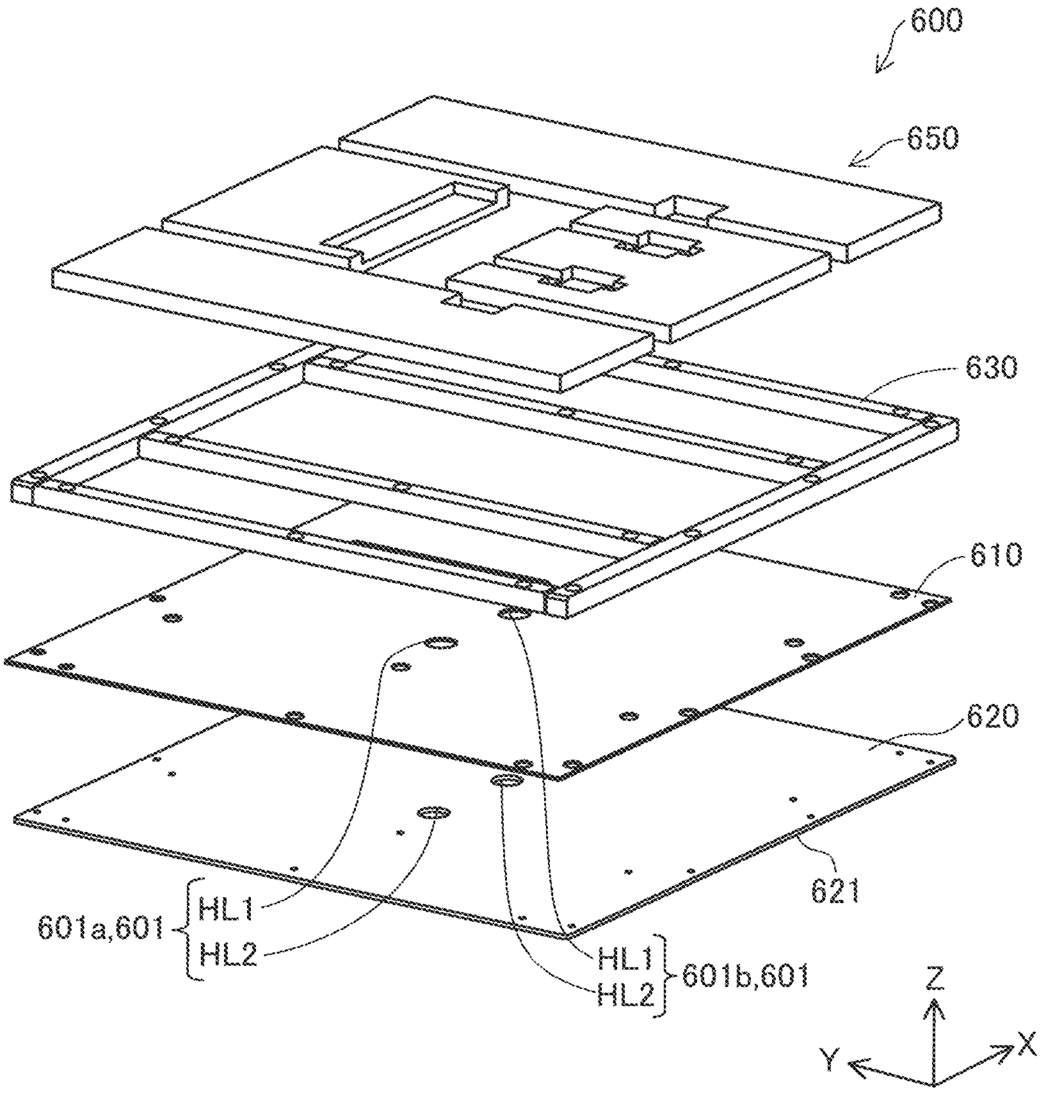
FIG. 6 is an exploded perspective view of the heating unit.

FIG. 5 is a perspective view illustrating a schematic configuration of the heating unit 600 and the movable unit 700 in the present embodiment. FIG. 6 is an exploded perspective view of the heating unit 600. As illustrated in FIGS. 5 and 6, the heating unit 600 includes a second heater 610 for heating a plasticized material stacked on the stage 300 to enhance interlayer adhesion, a heating plate 620 that transmits the heat of the second heater 610 to the plasticized material, a frame portion 630 that supports the heating plate 620, and a heat insulating unit 650 made of a heat insulating material. As illustrated in FIG. 6, the heating plate 620, the second heater 610, the frame portion 630, and the heat insulating unit 650 are stacked in this order from the bottom.

As illustrated in FIGS. 2, 5, and 6, a through hole 601 that pierces through the heating unit 600 in a direction orthogonal to a surface direction of the heating unit 600 is formed in the heating unit 600. In the present embodiment, a first through hole 601*a* and a second through hole 601*b* are formed as the through hole 601 in the heating unit 600. The first through hole 601*a* and the second through hole 601*b* are formed in the center in the Y direction of the heating unit 600. The second through hole 601*b* is formed on the +X direction side of the first through hole 601*a*. In the following explanation, when the first through hole 601*a* and the second through hole 601*b* are not particularly distinguished from each other, the first through hole 601*a* and the second through hole 601*b* are simply referred to as the through hole 601. As illustrated in FIG. 6, in the present embodiment, the through hole 601 is formed by a hole HL1 formed to pierce through the second heater 610 in the Z direction and a hole HL2 formed to pierce through the heating plate 620 in the Z direction being continuous in the Z direction.

At least a part of the nozzle 61 is located in the through hole 601 as illustrated in FIG. 2 when the plasticized material is discharged to form a three-dimensional shaped object. In FIG. 2, it can be said that the circumference of the nozzle 61 is surrounded by the heating unit 600 when viewed in the Z direction. In the following explanation, "when a three-dimensional shaped object is formed by discharging a plasticized material" is simply referred to as "at the time of shaping of a three-dimensional shaped object" or "at the time of shaping". In the present embodiment, at the time of shaping of a three-dimensional shaped object, the nozzle opening 62 is disposed between a heating surface 621 and the shaping surface 321 in the Z direction. Note that "between the heating surface 621 and the shaping surface 321" does not include the same position as the heating surface 621 and the same position as the shaping surface 321. Therefore, at least at the time of shaping of a three-dimensional shaped object, as illustrated in FIG. 2, the heating unit 600 is located above the tip 63 of the nozzle 61.

The nozzle 61 may not be located in the through hole 601 at time other than the time of shaping. For example, of the two discharge units 200, the discharge unit 200 not used at the time of shaping of a three-dimensional shaped object is moved upward with respect to the heating unit 600 by a fourth electric actuator 440 illustrated in FIG. 1 under the control of the control unit 500, whereby the nozzle 61 is moved to above the heating unit 600. As explained above, the fourth electric actuator 440 moves the discharge unit 200 in the Z direction to thereby switch a state in which the nozzle 61 is located in the through hole 601 and a state in which the nozzle 61 is not located in the through hole 601 by being located above the heating unit 600. Note that, in another embodiment, for example, the fourth electric actuator 440 may be configured to move the heating unit 600 in the Z direction with respect to the discharge unit 200 to thereby switch the state in which the nozzle 61 is located in the through hole 601 and the state in which the nozzle 61 is not located in the through hole 601.

The second heater 610 illustrated in FIG. 6 is configured by a rubber heater having a rectangular plate shape. The second heater 610 is electrically coupled to the control unit 500 via a not-illustrated wire. The output and the temperature of the second heater 610 are controlled by the control unit 500. In another embodiment, the second heater 610 may be configured by, for example, a halogen heater, a nichrome wire heater, or a carbon heater.

In the present embodiment, the heating plate 620 has a rectangular plate shape. The lower surface of the heating plate 620 forms the heating surface 621. The heating surface 621 indicates a surface close to the shaping surface 321 among surfaces of the heating unit 600. The second heater 610 is directly stuck to the upper surface of the heating plate 620. The heating plate 620 supplies the heat supplied from the second heater 610 to the shaping layer via the heating surface 621. In another embodiment, for example, the second heater 610 may be fixed to the heating plate 620 via an adhesive or may be fixed to the heating plate 620 by a fastener such as a bolt.

In the present embodiment, the heating plate 620 is formed of aluminum. Accordingly, for example, compared with when the heating plate 620 is formed of steel or stainless steel, the heat of the second heater 610 can be more efficiently transmitted to the plasticized material by the heating plate 620 and the heating plate 620 can be reduced in weight. In another embodiment, the heating plate 620 may be formed of, for example, steel or stainless steel.

The movable unit 700 includes a posture changing unit 800 configured to be capable of allowing the posture of the heating unit 600 to be changed. More specifically, the movable unit 700 in the present embodiment includes a support member 710 and a suspending portion 810 functioning as the posture changing unit 800.

The support member 710 is provided in the movable unit 700 such that the relative positions of the nozzle 61 and the stage 300 change. The support member 710 in the present embodiment includes a fixing plate 711 and a pair of arms 712. The fixing plate 711 has a rectangular plate shape elongated in the X direction and is provided in the movable unit 700 such that a plate surface thereof extends in the X direction and the Z direction and a longitudinal direction thereof extends in the X direction. The fixing plate 711 is referred to as rear plate as well. The arms 712 extend from the fixing plate 711 in the −Y direction and are fixed to the fixing plate 711 to face each other in the X direction.

As illustrated in FIG. 5, in the present embodiment, the movable unit 700 includes three suspending portions 810. In the present embodiment, a first suspending portion 810A suspends and supports the center in the X direction of the end in the Y direction of the heating unit 600. More specifically, the first suspending portion 810A suspends and supports the heating unit 600 in the −Z direction from the center in the X direction of the fixing plate 711. A second suspending portion 810B and a third suspending portion 810C support the further −Y direction side than the center position in the Y direction of the heating unit 600. More specifically, the second suspending portion 810B suspends and supports the heating unit 600 in the −Z direction from the arm 712 disposed on the −X direction side. The third suspending portion 810C suspends and supports the heating unit 600 in the −Z direction from the arm 712 disposed on the +X direction side.

As illustrated in FIG. 5, the end portions on the lower side of the second suspending portion 810B and the third suspending portion 810C are fixed to the frame portion 630 of the heating unit 600 via a first fixing member 631. The upper end portions of the second suspending portion 810B and the third suspending portion 810C are fixed to the arms 712 via a second fixing member 801. The end portion on the lower side of the first suspending portion 810A is fixed to the frame portion 630 via a third fixing member 632. An upper end portion of the first suspending portion 810A is fixed to the fixing plate 711 via a fourth fixing member 802.

The three suspending portions 810 are respectively configured to be adjustable in length in the Z direction. The user can adjust the parallelism of the shaping surface 321 of the stage 300 and the heating surface 621 of the heating unit 600 by respectively adjusting the lengths of the three suspending portions 810.

The first suspending portion 810A, the second suspending portion 810B, and the third suspending portion 810C may respectively include rod ends at the upper ends and the lower ends. In this case, the first fixing member 631, the second fixing member 801, the third fixing member 632, and the fourth fixing member 802 include support portions that rotatably supports the rod ends with respect to the support member 710. With such a configuration, the heating plate 620 can be suspended from the support member 710 so that the heating plate 620 can swing with respect to the support member 710 while the parallelism of the heating plate 620 with respect to the stage 300 being kept. Accordingly, when the heating plate 620 comes into contact with a shaped object, impact applied to the shaped object can be reduced.

As illustrated in FIG. 5, the three-dimensional shaping apparatus 100 in the present embodiment includes a detection mechanism 900 for detecting positional deviation of the heating unit 600.

Figure 7:
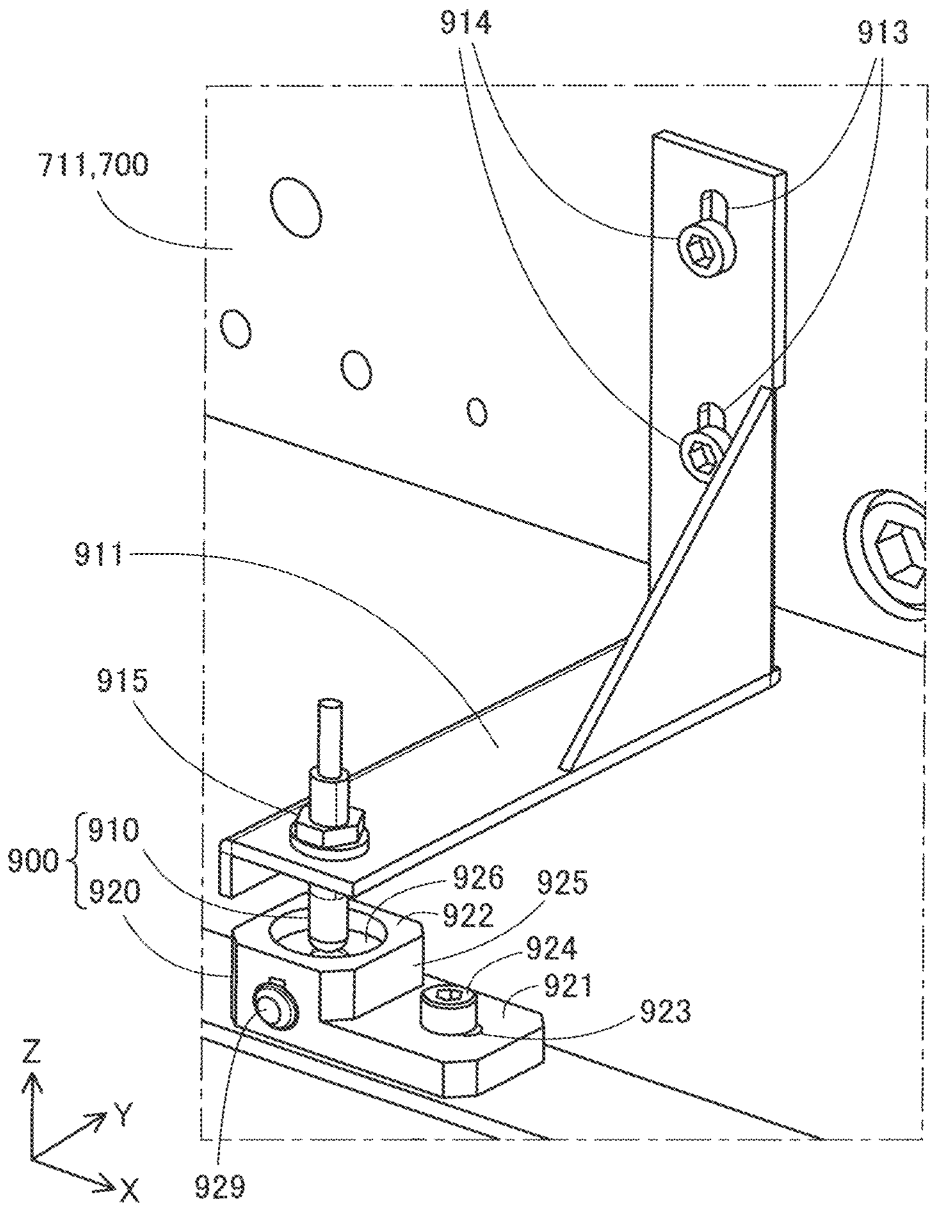
FIG. 7 is a perspective view of a detection mechanism.
Figure 8:
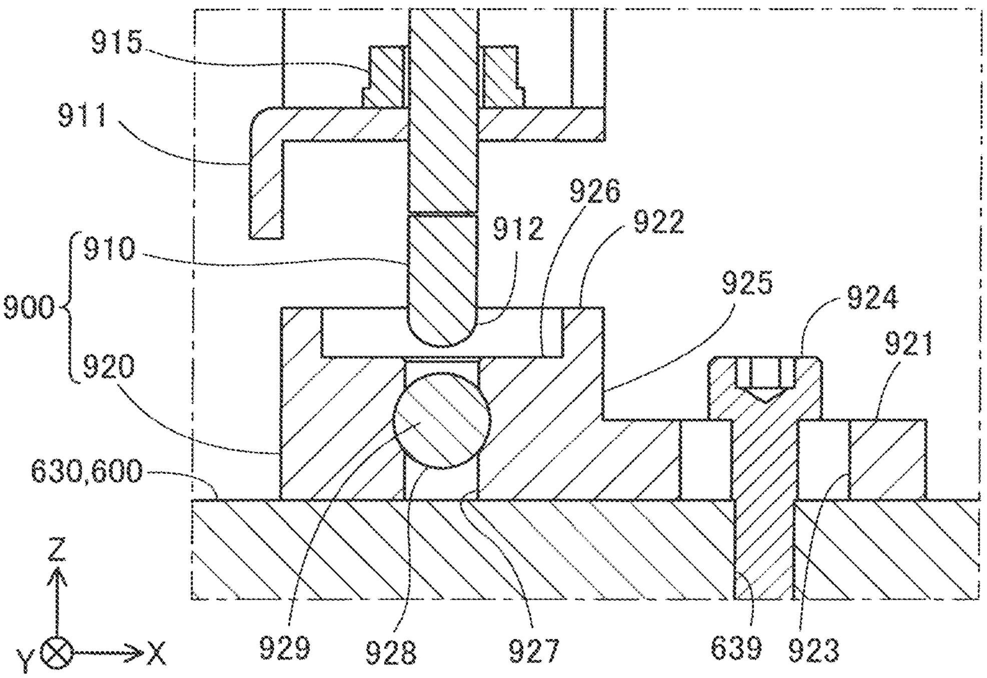
FIG. 8 is a cross-sectional view of the detection mechanism.

FIG. 7 is a perspective view of the detection mechanism 900. FIG. 8 is a cross-sectional view of the detection mechanism 900. The detection mechanism 900 includes a sensor 910 fixed to the movable unit 700 and a structure 920 fixed to the heating unit 600.

In the present embodiment, the sensor 910 is fixed to, via an L-shaped stay 911, the fixing plate 711 of the support member 710 provided in the movable unit 700. The sensor 910 is coupled to the control unit 500. The sensor 910 is a contact type sensor having a longitudinal direction and a rod-like shape. The sensor 910 is referred to as tactile switch as well. The sensor 910 is fixed to the movable unit 700 by the stay 911 such that the longitudinal direction thereof extends in the Z direction. The sensor 910 includes a tip portion 912 having a hemispherical tip. When an object comes into contact with the tip portion 912 from the X direction, the Y direction, or the Z direction, the sensor 910 transmits a contact signal indicating that the object comes into contact with the tip portion 912 to the control unit 500. Note that, in another embodiment, the sensor 910 may be fixed to the arm 712 of the support member 710.

The structure 920 includes a base portion 921 fixed to the heating unit 600 and a wall portion 922 provided to be contactable with the sensor 910. In the present embodiment, the base portion 921 is fixed to the frame portion 630 of the heating unit 600. A long hole 923 is formed in the base portion 921. A screw 924 is screwed into a screw hole 639 provided in the frame portion 630 through the long hole 923, whereby the structure 920 is fixed to the heating unit 600.

The long hole 923 is provided to adjust a fixing position of the structure 920 with respect to the heating unit 600.

In the present embodiment, the wall portion 922 surrounds at least a part of the sensor 910 when viewed in the −Z direction, which is a direction in which the sensor 910 extends. As illustrated in FIG. 7, in the present embodiment, the inner circumference of the wall portion 922 is a perfect circle when viewed in the −Z direction. In the present embodiment, the outer circumference of the tip portion 912 of the sensor 910 and the inner circumference of the wall portion 922 are concentric circles when viewed in the −Z direction. The wall portion 922 in the present embodiment is configured by forming a concave portion 926 on the upper surface of a convex portion 925 provided on the base portion 921.

A first hole 927 extending in the direction in which the sensor 910 extends is provided in the structure 920. In the present embodiment, the first hole 927 is provided at the center of the concave portion 926. The first hole 927 pierces through the structure 920 in the Z direction. The diameter of the first hole 927 is substantially the same as the diameter of the tip portion 912 of the sensor 910 and is slightly larger than the diameter of the tip portion 912 of the sensor 910. The first hole 927 is used to position the sensor 910 in the X and Y directions. The user positions the sensor 910 in the X direction and the Y direction by inserting the tip portion 912 of the sensor 910 into the first hole 927. Thereafter, the user moves the sensor 910 in the +Z direction and adjusts the position in the Z direction of the sensor 910 using a long hole 913 provided in the stay 911. By inserting a screw 914 into the long hole 913 and screwing the screw 914 into a screw hole provided in the fixing plate 711, the sensor 910 is fixed to the fixing plate 711 by the stay 911. After the sensor 910 is fixed to the fixing plate 711, the user can finely adjust the attachment height of the sensor 910 to the stay 911 with a nut 915 provided on the stay 911.

A second hole 928 is provided in the structure 920. The second hole 928 extends in a direction intersecting a direction in which the first hole 927 extends. In the present embodiment, the direction in which the first hole 927 extends is the Z direction and a direction in which the second hole 928 extends is the Y direction. The second hole 928 communicates with the first hole 927 in the structure 920. The structure 920 includes an insertion member 929 that is a member inserted into the second hole 928. In the present embodiment, the uppermost position of the insertion member 929 is present in a position lower than the bottom surface of the concave portion 926. The insertion member 929 is inserted into the second hole 928 after the sensor 910 is positioned using the first hole 927. That is, the insertion member 929 is inserted into the second hole 928 after the sensor 910 is pulled out from the first hole 927.

In the detection mechanism 900 configured as explained above, when the heating unit 600 comes into contact with the shaped object or the stage 300 and the heating unit 600 positionally deviates in the X direction or the Y direction, the positional deviation can be detected by the sensor 910 by coming into contact with the wall portion 922. When the heating unit 600 positionally deviates in the +Z direction, the sensor 910 can detect the positional deviation by coming into contact with the bottom surface of the concave portion 926 or the insertion member 929. The sensitivity of the detection mechanism 900 is determined by a formation position of the wall portion 922 with respect to the structure 920. As the diameter of the inner circumference of the wall portion 922 is smaller, the sensitivity of detection by the detection mechanism 900 increases. As the diameter of the inner circumference of the wall portion 922 is larger, the sensitivity decreases.

Figure 9:
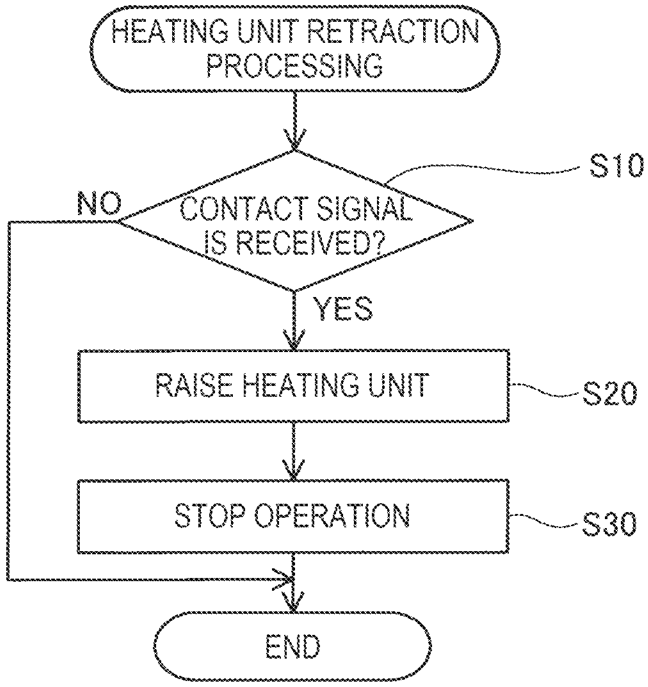
FIG. 9 is a flowchart of heating unit retraction processing.

FIG. 9 is a flowchart of heating unit retraction processing executed by the control unit 500. This processing is repeatedly executed at a predetermined cycle while the three-dimensional shaping apparatus is operating.

In step S10, the control unit 500 determines whether a contact signal has been received from the sensor 910. When determining that the contact signal has been received from the sensor 910, in step S20, the control unit 500 controls the third electric actuator 430 of the moving unit 400 and moves the movable unit 700 in the +Z direction to raise the heating unit 600 to relatively separate the heating unit 600 from the stage 300. At this time, a distance to relatively raise the heating unit 600 is, for example, 5 mm to 50 mm. Thereafter, in step S30, the control unit 500 stops the operation of the three-dimensional shaping apparatus 100.

When determining in step S10 that the contact signal has not been received, the control unit 500 skips steps S20 and S30.

In step S30 explained above, the control unit 500 may stop the operation of the three-dimensional shaping apparatus 100 and may warn, using a display device or an indicator lamp provided in the three-dimensional shaping apparatus 100, the user that positional deviation has occurred in the heating unit 600. The control unit 500 may perform the warning by outputting sound from a speaker. The control unit 500 may transmit an e-mail representing warning content to a preset mail address.

With the three-dimensional shaping apparatus 100 in the first embodiment explained above, since the sensor 910 for detecting positional deviation of the heating unit 600 is provided, it is possible to detect the positional deviation of the heating unit 600 due to the contact with the shaped object. Therefore, for example, the user can sense a molding defect such occurrence of warpage in the shaped object. In addition, for example, when the heating unit 600 changes from the +Z direction to the −Z direction at the time of shaping, it is possible to detect contact of the heating unit 600 with the shaped object.

The three-dimensional shaping apparatus 100 in the present embodiment includes the structure 920 and detects positional deviation of the heating unit 600 based on the contact of the sensor and the wall portion 922 provided in the structure 920. Therefore, it is possible to detect positional deviation of the heating unit 600 in the X and Y directions intersecting the Z direction, which is the direction in which the sensor 910 extends.

In the present embodiment, the first hole 927 extending in the direction in which the sensor 910 extends is provided in the structure 920. Therefore, it is possible to easily position the sensor 910 by using the first hole 927.

In the present embodiment, the second hole 928 extending in the direction intersecting the direction in which the first hole 927 extends and communicating with the first hole 927 is provided in the structure 920. The structure 920 includes the insertion member 929 inserted into the second hole 928. Therefore, since a part of the first hole 927 is filled with the insertion member 929, it is possible to detect a positional deviation in which the heating unit 600 relatively approaches the sensor 910 in the direction in which the sensor 910 extends.

In the present embodiment, when the positional deviation is detected by the sensor 910, the control unit 500 moves the movable unit 700 to thereby relatively separate the heating unit 600 from the stage 300. Therefore, it is possible to prevent the heating unit 600 from continuously being in contact the shaped object. It is possible to release the load between the two objects. Accordingly, a failure of the heating unit 600 can be suppressed. When there is an error in shaping data or control data for shaping a shaped object and the heating unit 600 unintentionally approaches the shaped object or the stage 300 together with the discharge unit 200, it is possible to prevent the heating unit 600 and the stage 300 from breaking down.

Note that, in the present embodiment, the control unit 500 does not have to execute the heating unit retraction processing illustrated in FIG. 9 during a period in which the three-dimensional shaping apparatus 100 is not shaping a shaped object. The period in which the three-dimensional shaping apparatus 100 is not shaping a shaped object is, for example, a period in which cleaning or maintenance is performed on the three-dimensional shaping apparatus 100. If the heating unit retraction processing is not executed in such a period, it is possible to prevent the heating unit 600 from unintentionally moving when the user erroneously touches the heating unit 600.

B. Second Embodiment

Figure 10:
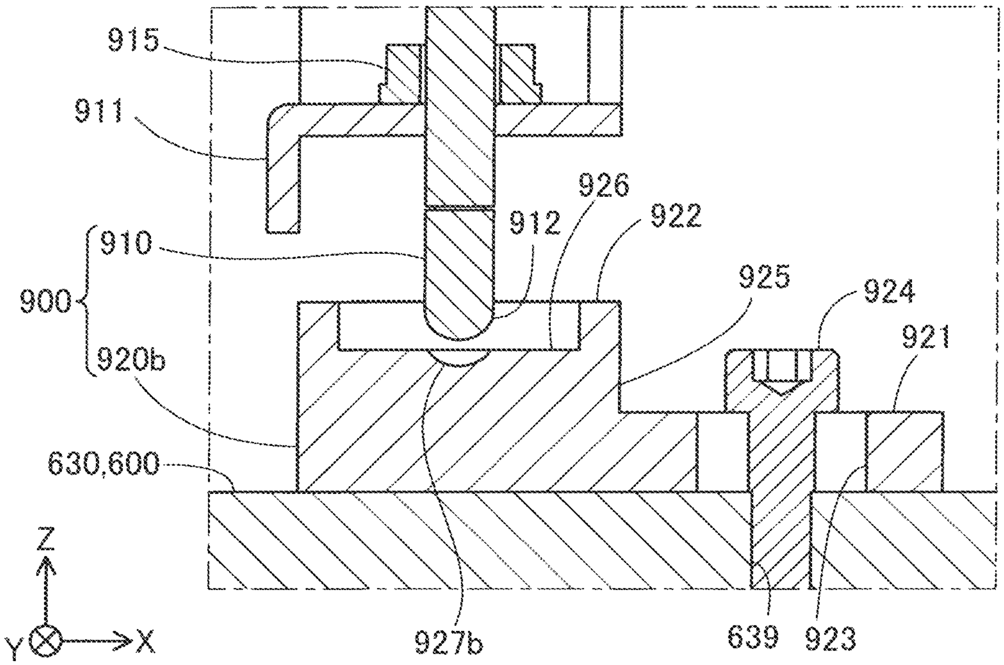
FIG. 10 is a cross-sectional view of the detection mechanism in a second embodiment.

FIG. 10 is a cross-sectional view of the detection mechanism 900 in a second embodiment. In the detection mechanism in the second embodiment, a configuration of a structure 920*b* is different from the configuration of the structure 920 in the first embodiment. The other components of the three-dimensional shaping apparatus 100 excluding the structure 920*b* are the same as the components in the first embodiment.

In the second embodiment, the bottom portion of a first hole 927*b* provided in the structure 920 has a shape corresponding to a part of the tip of the sensor 910. That is, in the second embodiment, the first hole 927*b* is formed as a substantially hemispherical recess. The depth of the first hole 927*b* is equivalent to the distance from the bottom of the concave portion 926 to the uppermost portion of the insertion member 929 inserted into the second hole 928 in the first embodiment. A user can position the sensor 910 in the X and Y directions by bringing the tip portion 912 of the sensor 910 into contact with the bottom portion of the first hole 927*b*. The sensor 910 can detect positional deviation in the +Z direction of the heating unit 600 by detecting contact of the first hole 927 and the tip portion 912.

According to the second embodiment explained above, the first hole 927*b* can realize both of the positioning of the sensor 910 in the X and Y directions and the detection of positional deviation of the heating unit 600 in the extending direction of the sensor 910. Therefore, the structure 920 can be formed in simple structure.

C. Other Embodiments (C1) In the embodiments explained above, the outer circumference of the tip portion 912 of the sensor 910 and the inner circumference of the wall portion 922 are concentric circles. In contrast, as in Example A illustrated in an upper part of FIG. 11, when viewed in the −Z direction, which is the direction in which the sensor 910 extends, the sensor 910 may be disposed at a position PS eccentric from the center CT on the XY plane of the space surrounded by the wall portion 922. Since the sensor 910 is disposed as explained above, the distance from the sensor 910 to the wall portion 922 is reduced in the direction from the center CT of the space surrounded by the wall portion 922 toward the eccentric position PS. Therefore, the sensitivity in that direction is increased. As a result, anisotropy can be imparted to the sensitivity of the sensor 910. Besides, anisotropy can also be imparted to the sensor 910 by, for example, forming the inner circumference of the wall portion 922 in a shape other than a perfect circle, for example, an elliptical shape or a rectangular shape.

Figure 11:
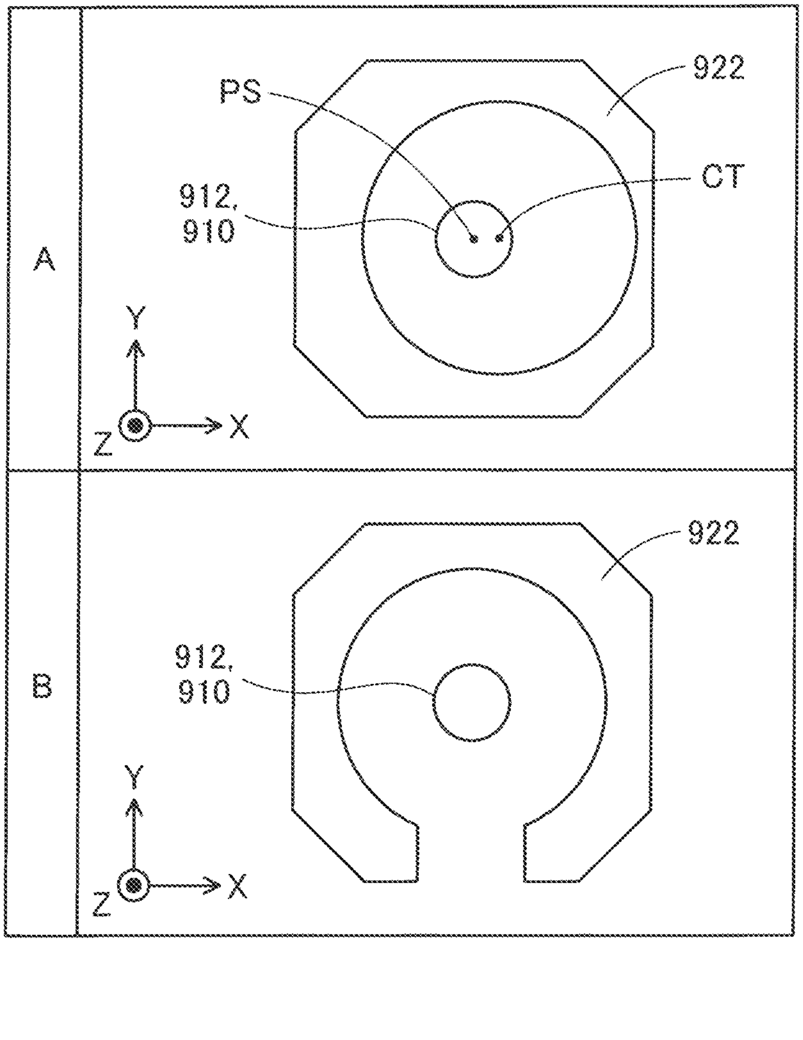
FIG. 11 is a diagram illustrating the detection mechanism in another embodiment.

As in Example B illustrated in a lower part of FIG. 11, when viewed in the −Z direction, the wall portion 922 may not surround the entire circumference of the sensor 910. Accordingly, the detection mechanism 900 can be configured not to detect positional deviation of the heating unit 600 in a specific direction.

(C2) In the embodiments explained above, the sensor 910 and the wall portion 922 do not overlap when viewed in the −Z direction in which the sensor 910 extends. In contrast, a part of the sensor 910 and a part of the wall portion 922 may be configured to overlap when viewed in the −Z direction in which the sensor 910 extends. For example, in Example C illustrated in an upper part of FIG. 12, the sensor 910 is disposed to be inclined with respect to the Z direction and the wall portion 922 is extended to above the tip portion 912 of the sensor 910 such that a part of the sensor 910 is configured to overlap a part of the wall portion 922 when viewed in the −Z direction. With such a configuration, positional deviation of the heating unit 600 in the −Z direction can be detected by the sensor 910. When the sensor 910 is disposed to be inclined with respect to the Z direction, by configuring the first hole 927*b* as in the second embodiment, even when the sensor 910 is inclined, the sensor 910 can be positioned in the X and Y directions.

Figure 12:
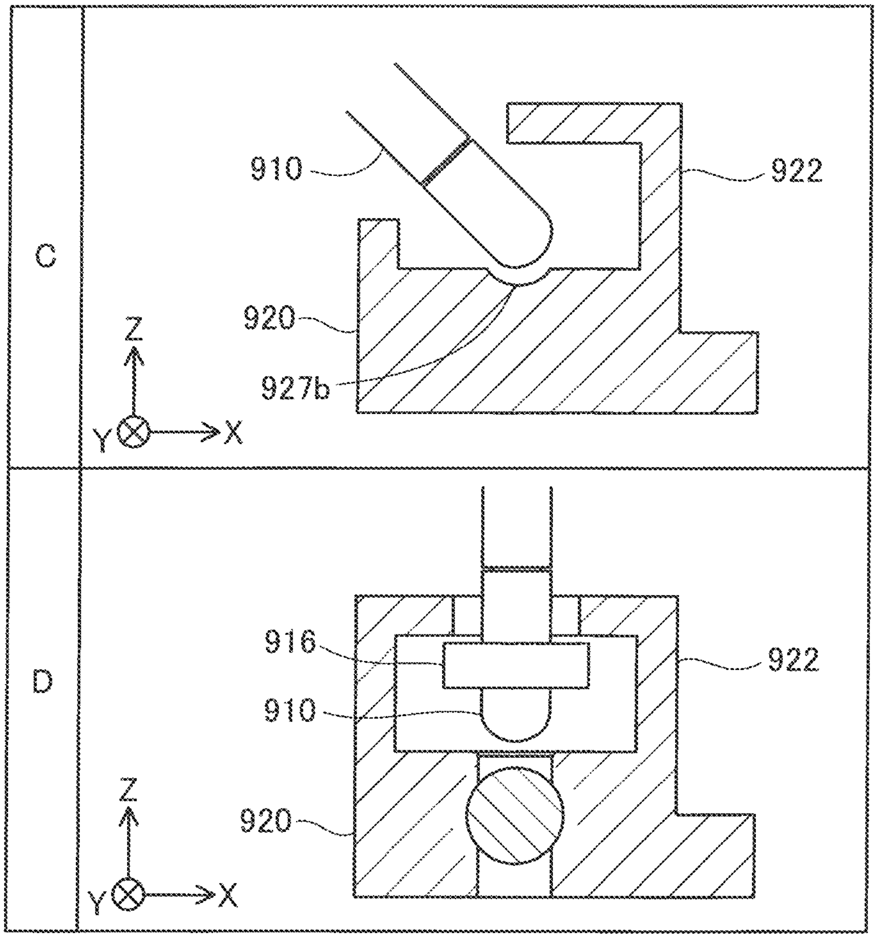
FIG. 12 is a diagram illustrating the detection mechanism in another embodiment.

As in Example D illustrated in a lower part of FIG. 12, even when the sensor 910 is disposed in the Z direction, by providing a flange 916 in the tip portion 912 of the sensor 910 and extending the wall portion 922 to above the flange 916, it is possible to configure a part of the sensor 910 and a part of the wall portion 922 to overlap when viewed in the −Z direction. Even in the configuration explained above, positional deviation of the heating unit 600 in the −Z direction can be detected by the sensor 910.

(C3) In the embodiments explained above, the sensor 910 is provided in the movable unit 700 and the structure 920 is provided in the heating unit 600. In contrast, the sensor 910 may be provided in the heating unit 600 and the structure 920 may be provided in the movable unit 700.

(C4) In the embodiments explained above, the user may prepare a plurality of types of structures 920 having different diameters and shapes of the inner circumference of the wall portion 922, select one of the structures 920 considering accuracy, coefficients of thermal expansion, allowable displacement amounts at the time of contact, and the like of components, and attach the selected structure 920 to the three-dimensional shaping apparatus 100. In this way, it is possible to protect the apparatus and prevent erroneous detection.

(C5) In the embodiments explained above, the wall portion 922 may include a variable mechanism that changes the size of the space surrounded by the wall portion 922. As such a mechanism, for example, a diaphragm mechanism, a shutter mechanism, or a slide mechanism can be adopted. If the size of the space in the wall portion 922 can be changed by such a mechanism, a detection range and sensitivity of the contact by the detection mechanism 900 can be optionally adjusted.

(C6) In the embodiments explained above, the heating unit 600 has the rectangular plate shape. However, the shape of the heating unit 600 is not limited thereto and may be circular. The shape of the heating unit 600 is not limited to the plate shape. The heating unit 600 may be, for example, a cylindrical or hemispherical heat source that radiates heat in a spot shape.

(C7) In the embodiments explained above, the first holes 927 and 927*b* are provided in the structure 920. However, the first holes 927 and 927*b* are not essential and may not be provided in the structure 920. In the first embodiment, the second hole 928 and the insertion member 929 can be omitted.

(C8) In the first embodiment explained above, when the contact of the sensor 910 and the heating unit 600 is detected, the control unit 500 moves the heating unit 600 to be separated from the stage 300. In contrast, when the contact of the sensor 910 and the heating unit 600 is detected, the control unit 500 may only warn the user without moving the heating unit 600.

(C9) In the embodiments explained above, the three-dimensional shaping apparatus 100 includes the two discharge units 200. In contrast, the three-dimensional shaping apparatus 100 may include only one discharge unit 200 or may include three or more discharge units 200.

(C10) In the embodiments explained above, the discharge unit 200 plasticizes the material with the flat screw. In contrast, the discharge unit 200 may plasticize the material by, for example, rotating an in-line screw. The discharge unit 200 may plasticize a filament-like material with a heater.

D. Other Aspects

The present disclosure is not limited to the embodiments explained above and can be implemented in various configurations without departing from the gist of the present disclosure. For example, technical features in the embodiments corresponding to technical features in aspects explained below can be replaced or combined as appropriate in order to solve a part or all of the problems described above or in order to achieve a part or all of the effects described above. Unless the technical features are explained as essential technical features in this specification, the technical features can be deleted as appropriate.

(1) According to a first aspect of the present disclosure, a three-dimensional shaping apparatus is provided. The three-dimensional shaping apparatus includes: a discharge unit including a plasticizing unit including a first heater and configured to plasticize a material to generate a plasticized material and a nozzle configured to discharge the plasticized material; a stage on which the plasticized material is stacked; a heating unit including a second heater configured to heat the plasticized material stacked on the stage, the heating unit being located above a tip of the nozzle at least when a three-dimensional shaped object is shaped; and a sensor configured to detect positional deviation of the heating unit. According to the aspect explained above, since positional deviation of the heating unit can be detected, it is possible to detect a defect of molding.

(2) In the aspect explained above, the three-dimensional shaping apparatus may further include: a movable unit in which the discharge unit and the heating unit are disposed; and a moving unit configured to change a relative position of the movable unit with respect to the stage, the sensor may be a contact type sensor, the three-dimensional shaping apparatus may include a structure including a wall portion that surrounds at least a part of the sensor when viewed in a direction in which the sensor extends, and the sensor may be fixed to one of the movable unit and the heating unit, and the structure may be fixed to another of the movable unit and the heating unit different from the one to which the sensor is fixed. According to the aspect, it is possible to detect positional deviation of the heating unit based on contact of the sensor and the structure.

(3) In the aspect explained above, a first hole extending in the direction in which the sensor extends may be provided in the structure. According to the aspect, it is possible to easily position the sensor by using the first hole.

(4) In the aspect explained above, a second hole extending in a direction intersecting the direction in which the first hole extends and communicating with the first hole may be provided in the structure, and the structure may include a member inserted into the second hole. According to the aspect, it is possible to detect positional deviation in which the heating unit relatively approaches the sensor in the direction in which the sensor extends.

(5) In the aspect explained above, the three-dimensional shaping apparatus may further include a control unit configured to control the moving unit to relatively separate the heating unit from the stage when the positional deviation is detected by the sensor. According to the aspect, it is possible to prevent the heating unit from being continuously in contact with the shaped object.

(6) In the aspect explained above, a bottom portion of the first hole may have a shape corresponding to a part of a tip of the sensor. According to the aspect, positioning of the sensor and detection of positional deviation of the heating unit in the direction in which the sensor extends can be implemented by a simple configuration.

(7) In the aspect explained above, the sensor may be disposed at a position eccentric from a center of a space surrounded by the wall portion when viewed in the direction in which the sensor extends. According to the aspect, it is possible to impart anisotropy to accuracy of positional deviation of the heating unit.

(8) In the aspect explained above, a part of the sensor may overlap a part of the wall portion when viewed in the direction in which the sensor extends. According to the aspect, it is possible to detect positional deviation in which the heating unit relatively moves away from the sensor in the direction in which the sensor extends.

The present disclosure is not limited to the three-dimensional shaping apparatus explained above and can be implemented by various aspects such as a detection method for positional deviation of the heating unit, a computer program for implementing the method, and a non-transitory tangible recording medium in which the computer program is recorded in a computer-readable manner.

What is claimed is:

1. A three-dimensional shaping apparatus comprising:

a discharge unit including a plasticizing unit including a first heater and configured to plasticize a material to generate a plasticized material and a nozzle configured to discharge the plasticized material;

a stage on which the plasticized material is stacked;

a heating unit including a second heater configured to heat the plasticized material stacked on the stage, the heating unit being located above a tip of the nozzle at least when a three-dimensional shaped object is shaped;

a sensor configured to detect positional deviation of the heating unit relative to the discharge unit;

a movable unit in which the discharge unit and the heating unit are disposed; and a moving unit configured to change a relative position of the movable unit with respect to the stage, wherein the sensor is a contact type sensor, the three-dimensional shaping apparatus comprises a structure including a wall portion that surrounds at least a part of the sensor when viewed in a direction in which the sensor extends, and the sensor is fixed to one of either the movable unit or the heating unit, and the structure is fixed to the other, such that the structure is connected to one of the movable unit or the heating unit, whichever is not connected to the sensor.

2. The three-dimensional shaping apparatus according to claim 1, wherein a first hole extending in the direction in which the sensor extends is provided in the structure.

3. The three-dimensional shaping apparatus according to claim 2, wherein a second hole extending in a direction intersecting the direction in which the first hole extends and communicating with the first hole is provided in the structure, and the structure includes a member inserted into the second hole.

4. The three-dimensional shaping apparatus according to claim 1, further comprising a control unit configured to control the moving unit to relatively separate the heating unit from the stage when the positional deviation is detected by the sensor.

5. The three-dimensional shaping apparatus according to claim 2, wherein a bottom portion of the first hole has a shape corresponding to a part of a tip of the sensor.

6. The three-dimensional shaping apparatus according to claim 1, wherein the sensor is disposed at a position eccentric from a center of a space surrounded by the wall portion when viewed in the direction in which the sensor extends.

7. The three-dimensional shaping apparatus according to claim 1, wherein a part of the sensor overlaps a part of the wall portion when viewed in the direction in which the sensor extends.

* * * * *